United States Patent
Kunins et al.

(10) Patent No.: US 7,140,004 B1
(45) Date of Patent: Nov. 21, 2006

(54) METHOD AND APPARATUS FOR ZERO-FOOTPRINT PHONE APPLICATION DEVELOPMENT

(75) Inventors: Jeff C. Kunins, San Francisco, CA (US); Hadi Partovi, San Francisco, CA (US); Brandon William Porter, Mountain view, CA (US); Matthew Talin Marx, Mountain View, CA (US); Angus Macdonald Davis, Sunnyvale, CA (US); Patrick McCormick, Sunnyvale, CA (US); John Giannandrea, Mountain View, CA (US); Andrew Clarke, San Francisco, CA (US); Tom Thai, Palo Alto, CA (US); Eckart Walther, Palo Alto, CA (US); Daniel Joseph Howard, Mountain View, CA (US); James Robert Everingham, Santa Cruz, CA (US)

(73) Assignee: Tellme Networks, Inc., Mountain View, CA (US)

( * ) Notice: Subject to any disclaimer, the term of this patent is extended or adjusted under 35 U.S.C. 154(b) by 603 days.

(21) Appl. No.: 09/592,241

(22) Filed: Jun. 13, 2000

(51) Int. Cl.
*G06F 9/44* (2006.01)
*H04M 11/00* (2006.01)
*H04M 1/64* (2006.01)

(52) U.S. Cl. .................. 717/125; 717/131; 717/132; 717/133; 717/130; 717/124; 379/29.02; 379/88.16; 379/88.17; 379/88.18

(58) Field of Classification Search ............. 379/88.11, 379/88.22, 88.16–88.18, 29.02, 27.02, 10.02; 717/120–129, 130–133; 345/441; 704/270
See application file for complete search history.

(56) References Cited

U.S. PATENT DOCUMENTS 5,799,063 A    8/1998   Krane (Continued)

OTHER PUBLICATIONS

"Dictionary of Computing", Fourth Edition; Oxford University Press, 1996; pp. 507-508.*

(Continued)

*Primary Examiner*—Kakali Chaki
*Assistant Examiner*—William Wood
(74) *Attorney, Agent, or Firm*—Harrity Snyder, LLP

(57) ABSTRACT

A zero-footprint remotely hosted phone application development environment is described. The environment allows a developer to use a standard computer without any specialized software (in some embodiments all that is necessary is a web browser and network access) together with a telephone to develop sophisticated phone applications that use speech recognition and/or touch tone inputs to perform tasks, access web-based information, and/or perform commercial transactions. Some embodiments support concurrent call flow tracking that allows a developer to observe, using a web browser, the execution of her/his application. A variety of reusable libraries are provided to enable the developer to leverage well-developed libraries for common playback, input, and computational tasks. Embodiments support rapid application deployment from the development environment to hosted application deployment to the intended audience.

35 Claims, 7 Drawing Sheets

U.S. PATENT DOCUMENTS

| | | | | |
|---|---|---|---|---|
| 5,913,195 | A | * | 6/1999 | Weeren et al. ............... 704/270 |
| 5,945,989 | A | | 8/1999 | Freishtat et al. |
| 5,974,118 | A | * | 10/1999 | Capriotti et al. ......... 379/88.22 |
| 6,091,896 | A | * | 7/2000 | Curreri et al. ............... 717/125 |
| 6,119,247 | A | * | 9/2000 | House et al. ................ 714/38 |
| 6,157,706 | A | * | 12/2000 | Rachelson ............ 379/100.08 |
| 6,182,045 | B1 | * | 1/2001 | Kredo et al. ............... 704/270 |
| 6,232,984 | B1 | * | 5/2001 | Chuah et al. ............... 345/441 |
| 6,259,771 | B1 | * | 7/2001 | Kredo et al. ............. 379/88.17 |
| 6,282,701 | B1 | * | 8/2001 | Wygodny et al. ........... 717/125 |
| 6,301,703 | B1 | * | 10/2001 | Shank et al. ................ 717/109 |
| 6,338,085 | B1 | * | 1/2002 | Ramaswamy ............... 704/235 |
| 6,400,807 | B1 | * | 6/2002 | Hewitt et al. ............ 379/88.11 |
| 6,411,615 | B1 | * | 6/2002 | DeGolia et al. ............ 370/352 |
| 6,412,106 | B1 | * | 6/2002 | Leask et al. ................ 717/124 |
| 6,456,699 | B1 | * | 9/2002 | Burg et al. ............. 379/88.17 |
| 2001/0013001 | A1 | * | 8/2001 | Brown et al. ............ 704/270.1 |
| 2001/0014839 | A1 | * | 8/2001 | Belanger et al. ............ 700/245 |

OTHER PUBLICATIONS

"Dictionary of Computing", Fourth Edition; Oxford University Press; 1996; pp. 507-508.*

VoxML 1.0 Language Reference, Revision 1.0a, Motorola, Inc., Oct. 1998, pp. 1-51.

VoxML 1.0 Application Development Guide, Revision 1.0, Motorola, Inc., Sep. 1998, pp. 1-31.

Motorola VoxML Team, "VoxML SDK 1.0a Interim Release Notes", Motorola, Inc. Dec. 1998, 5 pgs.

VoiceXML Forum, "Voice Extensible Markup Language—VoiceXML", Ver. 0.9, Aug. 1999, 63 pgs.

James, Frankie, "AHA: audio HTML access", Computer Networks and ISDN systems, vol. 29 (1997), pp. 1395-1404.

James, Frankie, "Lessons from Developing Audio HTML Interfaces", Proceedings of The Third Intl. ACM Conf. on Assistive Technologies (ASSETS '98), ACM Press, Apr. 1998, pp. 27-34.

Raman, T.V., "Cascaded speech style sheets", Computer Networks and ISDN systems, vol. 29 (1997), pp. 1377-1383.

Abrams, Marc, et al., "UIML: an appliance-independent XML user interface language", Computer Networks, vol. 31 (1999), pp. 1695-1708.

VoiceXML Forum, "Voice eXtensible Markup Language (VoiceXML)—Technical Background", copy-right AT&T (1999), printed from website "www.vxmlforum.org/tech_bkgrnd.html" Aug. 17, 1999, 3 pgs.

Cover, Robin, "The SGML/XML Web Page—Speech ML", Feb. 22, 1999, printed from website "www.oasis-open.org/cover/speechML.html" Aug. 17, 1999, 2 pgs.

Cover, Robin, "The SGML/XML Web Page—VoxML Markup Language", Mar. 2, 1999, printed from website "www.oasis-open.org/cover/speechML.html" Aug. 17, 1999, 3 pgs.

Nuance 6, product description, Nuance Communications, Menlo Park, CA, (1999), 2 pgs.

Nuance Developer's Toolkit, Nuance Communications, Menlo Park, CA, (1998), 2 pgs.

Schmandt, Chris, et al., "Augmenting a Window System with Speech Input", IEEE, Aug. 1990, pp. 50-55.

"Nuance Delivers V-Builder 1.0, The Industry Graphical . . . ", Press Release, printed from website Jul. 24, 2000.

* cited by examiner

Scratchpad 306

Fig 5

Which call indicator 500

Color coded debugging output 502

Tellme Studio Debug Log

Call 1-800-755-#### to test your application

Log started at: Tue Jun 6 16:07:43 PDT 2000
Developer ID: ######
Call Number: All calls View Legend

Call number 000114

[06/06/2000:16:07:19 DST] DEV : 000114 ACCESS Exiting container - http://studio.tellme.com/vxml/operator.vxml#block0
[06/06/2000:16:07:19 DST] DEV : 000114 ACCESS Exiting container - http://studio.tellme.com/vxml/operator.vxml#Staging_goto
[06/06/2000:16:07:19 DST] DEV : 000114 MOOHAND Set: [[session].[history]] <- [form0] (prepend)
[06/06/2000:16:07:19 DST] DEV : 000114 MOOHAND Set: [[session].[history]] <- [block0] (prepend)
[06/06/2000:16:07:19 DST] DEV : 000114 STATE event thrown: prompt
[06/06/2000:16:07:19 DST] DEV : 000114 MOOHAND Set: [[session].[reserved].[studio].[developer].[homeurl]] <-
[http://www.valdemar.net/erik/grocery.vxml]
[06/06/2000:16:07:20 DST] DEV : 000114 MOOHAND Set: [[session].[history]] <- [main] (prepend)
[06/06/2000:16:07:20 DST] DEV : 000114 ACCESS Entering container - http://www.valdemar.net/erik/grocery.vxml#main
[06/06/2000:16:07:20 DST] DEV : 000114 MOOHAND Set: [[session].[history]] <- [block0] (prepend)
[06/06/2000:16:07:20 DST] DEV : 000114 ACCESS Entering container - http://www.valdemar.net/erik/grocery.vxml#block0
[06/06/2000:16:07:20 DST] DEV : 000114 STATE event thrown: prompt
[06/06/2000:16:07:20 DST] DEV : 000114 MOOHAND Set: [[session].[generic].[l_meats].[0]] <- [crocodile liver] (set)

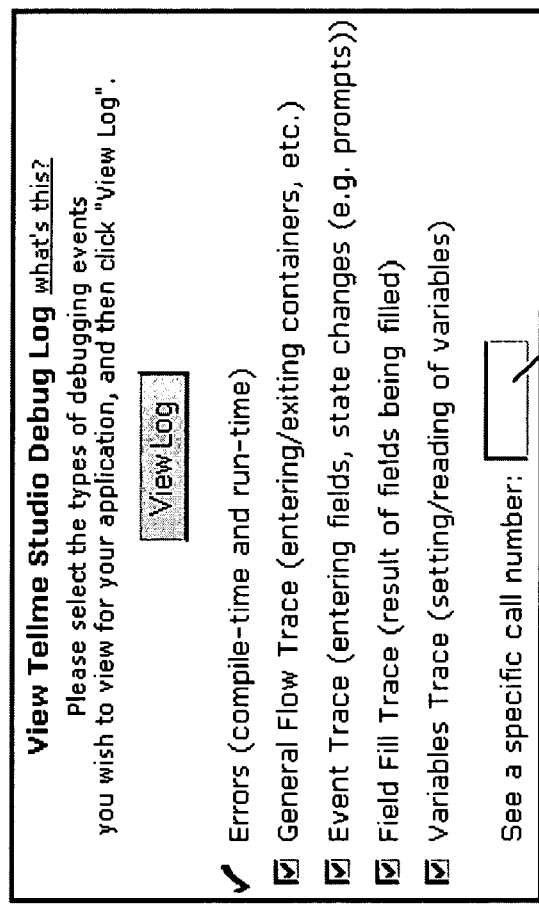

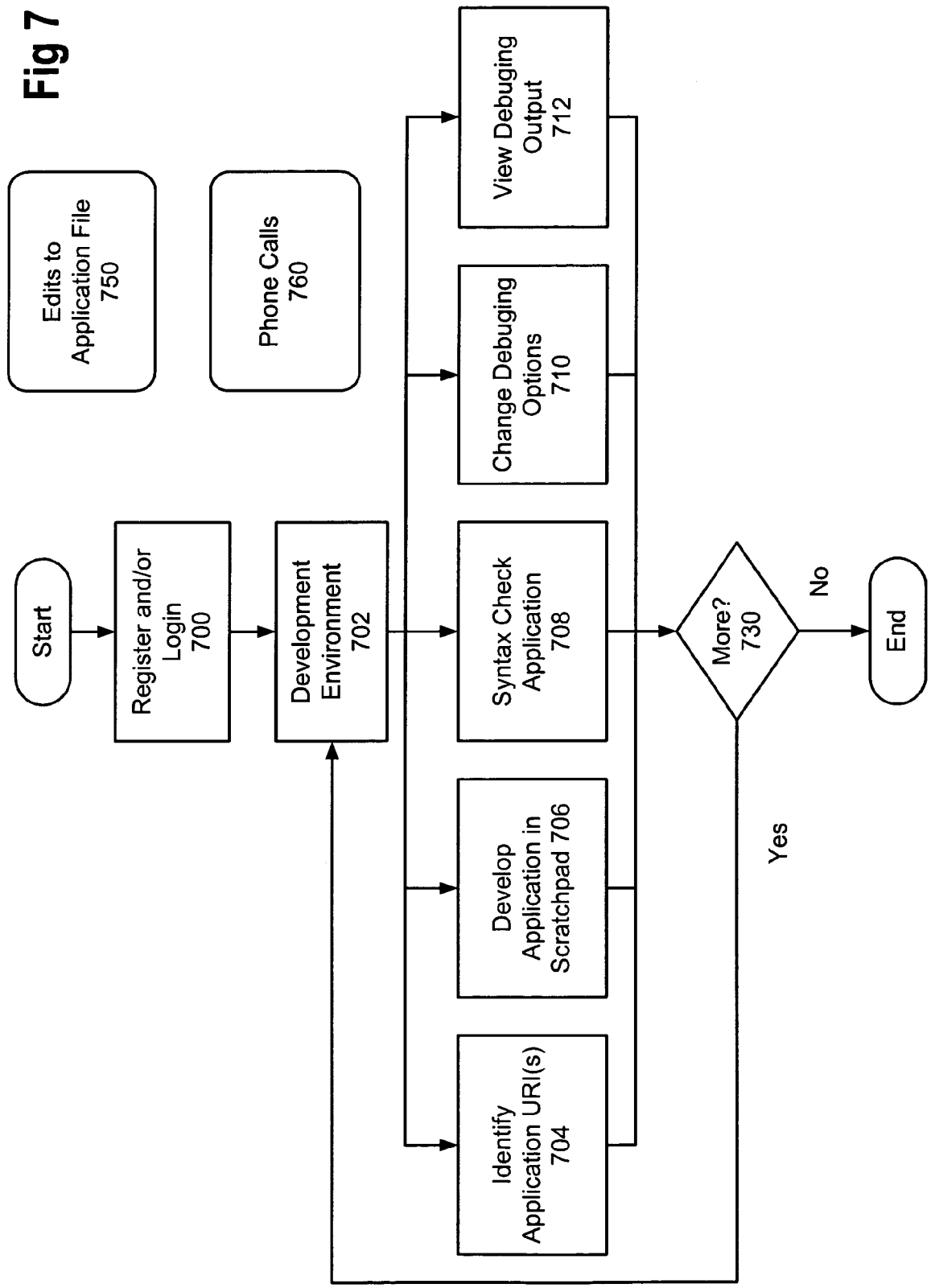

METHOD AND APPARATUS FOR ZERO-FOOTPRINT PHONE APPLICATION DEVELOPMENT

BACKGROUND OF THE INVENTION

1. Field of the Invention

This invention relates to the field of application development. In particular, the invention relates to technologies for developing interactive telephone applications.

2. Description of the Related Art

Prior techniques for developing telephone applications have required the application developer, also known as a programmer, to use specialized development software and/or hardware. For example, if a developer wanted to create phone applications using Nuance(™) voice recognition software, from Nuance Communications, Menlo Park, Calif., they would have to set up a specialized development computer system, obtain the required telephony equipment, obtain suitable development tools (e.g. compilers), as well as obtain and install the necessary speech recognition system.

This cumbersome process drastically limits the number of people who can develop and deploy phone applications. Further, the software license fees and hardware costs associated with obtaining the necessary tools limit who can be a developer. For example, an individual developer might need to obtain, configure, and have licenses to a variety of tools including: a speech recognizer, a speech programming toolkit, the target interactive voice response (IVR) system or telephony cards, a compiler, a comprehensive understanding of the grammars supported by the speech recognizer, and/or other specialized materials.

Further, emerging standards such as VoiceXML, see <http://www.voicexml.org/>, do not come pre-packaged with programming tools and development environments. This is in stark contrast to other World Wide Web Consortium (W3C) standards such as hypertext markup language (HTML) which is widely deployed in browsers such as Internet Explorer(™) from Microsoft Corporation, Redmond, Wash. Further, like HTML, specific platforms may provide implementation specific features that differ slightly from one provider to another.

The prior approaches to phone application development required proprietary tools that limited the ability of individuals to rapidly develop phone applications without specialized software and/or hardware. Accordingly, what is needed is a method and apparatus for developing phone applications that allows users with standard hardware and software, e.g. personal computer with Internet access, and a telephone to develop phone applications. The method and apparatus should support debugging of telephone applications as well as shared code reuse of VoiceXML components, grammars, audio prompts, sound files, and/or other phone application features. Further, the method and apparatus should minimize the need for the developer to understand the intricacies related to defining grammars by allowing the developer to easily define grammars in their phone applications and also leverage packaged grammars. Further, the method and apparatus should support rapid deployment of a phone application into a hosted environment for use by end users of the application.

SUMMARY OF THE INVENTION

A zero-footprint remotely hosted phone application development environment is described. The environment allows a developer to use a standard computer without any specialized software (in some embodiments all that is necessary is a web browser and network access) together with a telephone to develop sophisticated phone applications that use speech recognition and/or touch tone inputs to perform tasks, access web-based information, and/or perform commercial transactions.

For example, in preparation for a sales pitch for selling hosting services, a non-programmer could easily develop a short application appropriate to the target customer. After the pitch, a developer id code (and password) could be left with the target customer to allow them to more fully develop the application. Further, when the target customer is satisfied with the application, they can complete any necessary legal agreements for hosting and have their application live for their actual (as opposed to test) users at a suitable phone number without any changes. The development environment can be configured to behave identically (any extensions, features, libraries, modules, etc.) to the hosting environment so as to avoid any surprises due to incompatibilities.

Development is accomplished primarily by identifying an entry point into the phone application, e.g. the URI of the start of the application, to the development environment. The developer can then immediately use a telephone to call the application on the remotely-hosted development environment and test it out. Alternatively, the application itself can be prepared in the browser using a scratchpad mode.

Call flow tracking that is concurrent with placed calls allows the developer to observe, using a web browser, the execution of her/his application in some embodiments of the invention. Other call flow, or debugging, features are customizable to allow the developer flexibility to debug and monitor the behavior of her/his application.

A variety of reusable libraries can be provided to enable the developer to leverage well-developed libraries for common playback, input, and computational tasks. This focuses the development on application specific logic. For example, high quality audio recordings of commonly used phrases, terms, etc., can be provided, e.g., times, durations, dates, monetary values, cities/states, credit card numbers, phone numbers, etc. Similarly, high quality grammars can be provided for recognizing common types of input. Other modules and utility functions may provide programmatic methods to the developer. Many of these libraries can be packaged to preserve the opacity of the implementation, e.g. limit access by the developer to the underlying implementation/source.

BRIEF DESCRIPTION OF THE FIGURES

FIGS. 3–6 are screen shots of web pages presented by the remotely hosted phone application development environment to developers.

FIG. 7 is a process flow chart for developing an application using the remotely host phone application development environment.

DETAILED DESCRIPTION

A. Introduction

Figure 1:
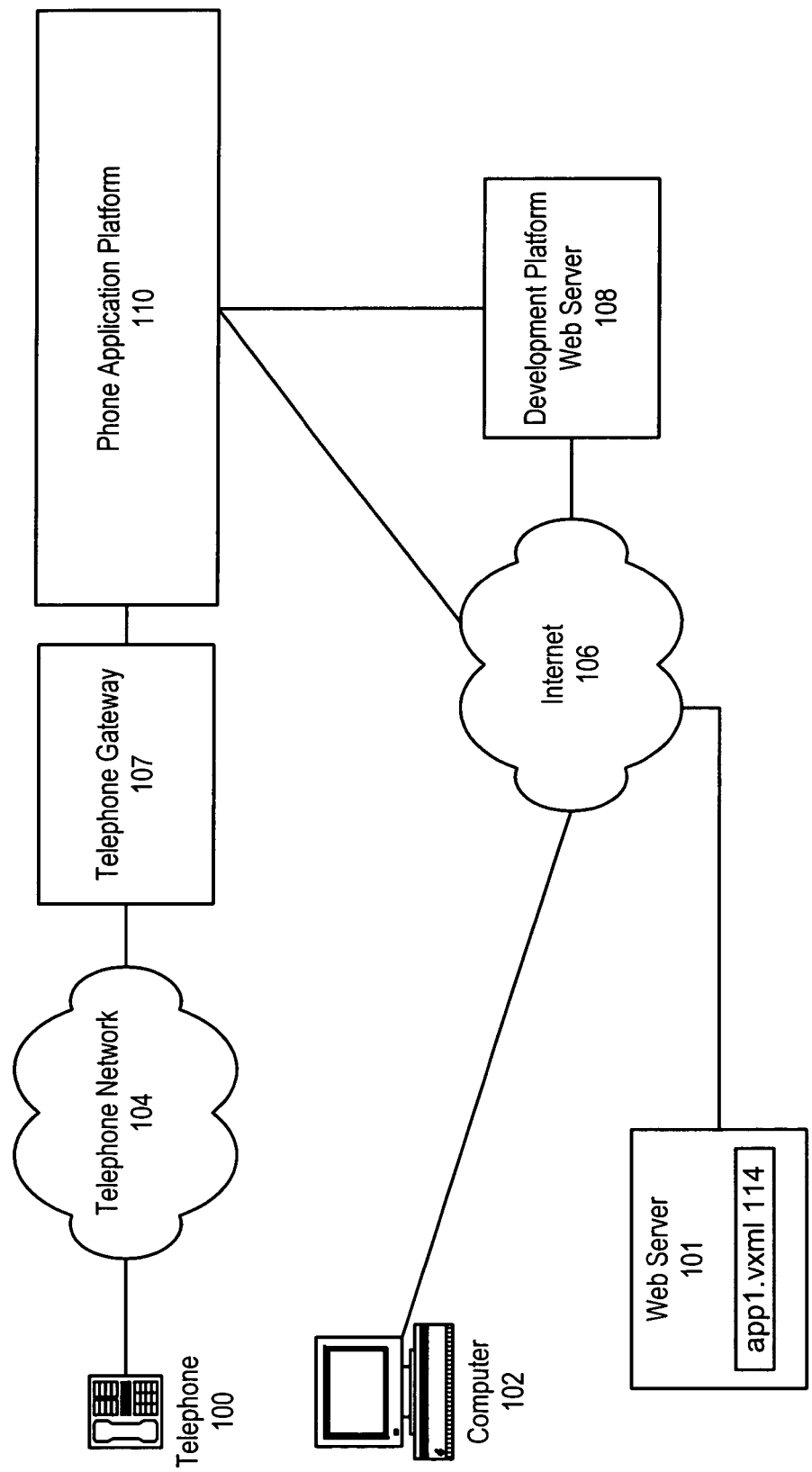
FIG. 1 illustrates a system including embodiments of the invention used to support remotely hosted phone application development.

A remotely hosted method and apparatus for developing telephone applications is described. This allows developers, or programmers, to easily create phone applications without the need for specialized hardware or software on their local machines. Applications developed using the system can then be deployed, or hosted, in a platforms such as a voice portal, an interactive voice response (IVR) system, and/or some other voice access medium.

End users of phone applications can use telephones, including cellular telephones, to access the phone applications and retrieve information, purchase goods and services, and/or complete other tasks. In some embodiments of the invention, the applications are able to retrieve information from the World Wide Web (WWW), databases, third parties, and/or other sources.

The features that developers can offer in their telephone application are constrained by the limitations—but also receive the advantages—of the particular implementation platform. For example, some platforms can receive dual-tone multi-frequency (DTMF or touch-tone) commands as well as spoken commands to further control the content presented and direct commerce transactions as well as the manner of presentation. The term audio request, or input, is used to refer to either a voice or touch-tone input, or a combination of the two types of input.

Similarly, different platforms may allow different levels of access to telephone identifying information. Developers may wish to use telephone identifying information to personalize caller interactions with their applications. Also, some platforms may provide a uniform state management mechanism for phone applications.

Applicants note several commonly owned and assigned co-pending patent applications relating to features provided by phone application platforms such as a voice portal:

| Serial # | Title | Filing Date |
|---|---|---|
| 09/466,236 | Method and Apparatus for Electronic Commerce Using a Telephone Interface | Dec. 17, 1999 |
| 09/426,102 | Method and Apparatus for Content Personalization over a Telephone Interface | Oct. 22, 1999 |

The invention will be described in greater detail as follows. First, a number of definitions useful to understanding the invention are presented. Then, the hardware and software architecture for the remotely hosted development environment are presented. Finally, the processes and features of the remotely hosted development environment are presented in greater detail.

B. Definitions

1. Telephone Identifying Information

For the purposes of this application, the term telephone identifying information will be used to refer to ANI information, CID information, and/or some other technique for automatically identifying the source of a call and/or other call setup information. For example, telephone identifying information may include a dialed number identification service (DNIS). Similarly, CID information may include text data including the subscriber's name and/or address, e.g. "Jane Doe". Other examples of telephone identifying information might include the type of calling phone, e.g. cellular, pay phone, and/or hospital phone.

Additionally, the telephone identifying information may include wireless carrier specific identifying information, e.g. location of wireless phone now, etc. Also, signaling system seven (SS7) information may be included in the telephone identifying information.

2. User Profile

A user profile is a collection of information about a particular user. The user profile typically includes collections of different information of relevance to the user, e.g., account number, name, contact information, user-id, default preferences, and the like. Notably, the user profile contains a combination of explicitly made selections and implicitly made selections.

Explicitly made selections in the user profile stem from requests by the user to the system. For example, the user might add business news to the main topic list. Typically, explicit selections come in the form of a voice, or touch-tone command, to save a particular location, e.g. "Remember this", "Bookmark it", "shortcut this", pound (#) key touch-tone, etc., or through adjustments to the user profile made through the web interface using a computer.

Additionally, the user profile provides a useful mechanism for associating telephone identifying information with a single user, or entity. For example, Jane Doe may have a home phone, a work phone, a cell phone, and/or some other telephones. Suitable telephone identifying information for each of those phones can be associated in a single profile for Jane. This allows the system to provide uniformity of customization to a single user, irrespective of where they are calling from.

In contrast, implicit selections come about through the conduct and behavior of the user. For example, if the user repeatedly asks for the weather in Palo Alto, Calif., the system may automatically provide the Palo Alto weather report without further prompting. In other embodiments, the user may be prompted to confirm the system's implicit choice, e.g. the system might prompt the user "Would you like me to include Palo Alto in the standard weather report from now on?"

Additionally, the system may allow the user to customize the system to meet her/his needs better. For example, the user may be allowed to control the verbosity of prompts, the dialect used, and/or other settings for the system. These customizations can be made either explicitly or implicitly. For example if the user is providing commands before most prompts are finished, the system could recognize that a less verbose set of prompts is needed and implicitly set the user's prompting preference to briefer prompts.

3. Topics and Content

A topic is any collection of similar content. Topics may be arranged hierarchically as well. For example, a topic might be business news, while subtopics might include stock quotes, market report, and analyst reports. Within a topic different types of content are available. For example, in the stock quotes subtopic, the content might include stock quotes. The distinction between topics and the content within the topics is primarily one of degree in that each topic, or subtopic, will usually contain several pieces of content.

4. Demographic and Psychographic Profiles

Both demographic profiles and psychographic profiles contain information relating to a user. Demographic profiles typically include factual information, e.g. age, gender, marital status, income, etc. Psychographic profiles typically include information about behaviors, e.g. fun loving, analytical, compassionate, fast reader, slow reader, etc. As used in this application, the term demographic profile will be used to refer to both demographic and psychographic profiles.

C. Voice Portal Overview

1. Hardware and Software Architecture

First, the hardware and software architecture of a system including an embodiment of the invention will be described with reference to FIGS. 1–2. FIG. 1 illustrates a system including embodiments of the invention used to support remotely hosted phone application development. The system of FIG. 1 can be used to allow developers with a standard computer and a telephone, or cellular telephones, to develop telephone applications without the need for specialized hardware and/or software.

The following lists the elements of FIG. 1 and describes their interconnections. FIG. 1 includes a telephone 100, a computer 102, a telephone network 104, an Internet 106, a telephone gateway 107, a development platform web server 108, a phone application platform 110, a web server 101 and a phone application 114. The telephone 100 is coupled in communication with the telephone network 104. The telephone network 104 is coupled in communication with the telephone gateway 107. The telephone gateway 107 is coupled in communication with the phone application platform 110. The computer 102 is coupled in communication with the Internet 106. The Internet 106 is coupled in communication with the web server 108, the web server 101, and the phone application platform 110. Additionally, not shown in FIG. 1, a shared database 112 may provide a common storage for the development platform web server 108 and the phone application platform 110.

The following describes each of the elements of FIG. 1 in greater detail. The telephone 100 is a telephone interfaces to the phone application platform 110. The telephone 100 may be any sort of telephone and/or cellular telephone. For example the telephone 100 or may be a land line phone, a PBX telephone, a satellite phone, a wireless telephone, and/or any other type of communication device capable of providing voice communication and/or touch-tone signals over the telephone network 104. However, any audio signal carrying interface could be used.

The telephone network 104 may be the public switched telephone network (PSTN) and/or some other type of telephone network. For example, some embodiments of the invention may allow users with a voice over Internet Protocol (IP) phone to access the phone application platform 110. The telephone network 104 is coupled to the telephone gateway 107 that allows the voice communications and/or touch-tone signals from the telephone network 104 to reach the phone application platform 110 in usable form. Similarly, the telephone gateway 107 allows audio signals generated by the phone application platform 110 to be sent over the telephone network 104 to respective telephones, e.g. the telephone 100. The telephone network 104 generally represents an audio signal carrying network.

The computer 102 is a computer such as a personal computer, a thin client computer, a server computer, a handheld computer, a set top box computer, and/or some other type of visual web browsing device. The computer 102 is coupled in communication with the Internet 106, e.g. by a dial-up connection, a digital subscriber loop (DSL), a cable modem, and/or some other type of connection. This allows the computer 102 to communicate with the web server 108 and the web server 101. The computer 102 typically provides a visual interface to the WWW and the web server 108 using web browsing software such as Internet Explorer(™) from Microsoft Corporation, Redmond, Wash.

The web server 101 is any web server to which the developer has access. In some instances, the web server 101 may be hosted on the computer 102. For example, versions of Windows(™) from Microsoft Corporation, Redmond, Wash., can support a web server for allowing one or more files local to the computer 102 to be accessed over the Internet 106 using a web protocol, e.g. hypertext transfer protocol (HTTP), file transfer protocol (FTP), and/or some other protocol. In other instances, the web server 101 may be hosted on computers of the developer's Internet service provider (ISP).

The development platform web server 108 includes one or more web based applications for providing the web portion of the remotely hosted development environment. The features of the development platform web server 108 are described in greater detail below.

Figure 2:
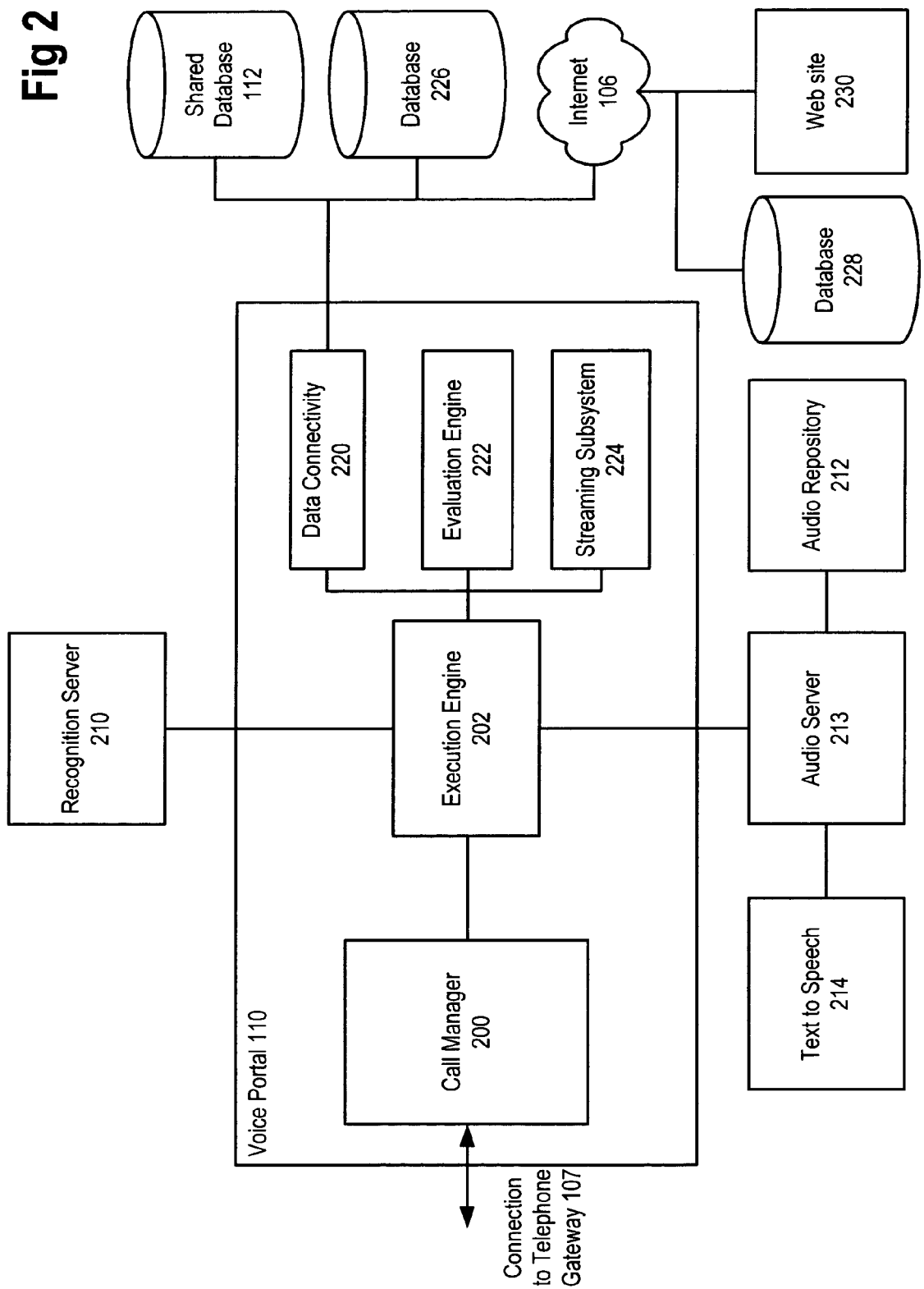
FIG. 2 illustrates the components of a phone application platform supporting remotely hosted phone application development.

FIG. 2 illustrates the components of a phone application platform supporting remotely hosted phone application development. This could be used to support the phone application platform 110 and allow for remotely hosted phone application development. This description describes one particular phone application platform; however, the remotely host application development method and apparatus are not particular to this phone application platform.

The following lists the elements of FIG. 2 and describes their interconnections. The phone application platform 110 is coupled in communication with the telephone gateway 107. The phone application platform 110 includes a call manager 200, an execution engine 202, a data connectivity engine 220, an evaluation engine 222 and a streaming engine 224. Additionally FIG. 2 includes elements that may be included in the phone application platform 110, or which may be separate from, but coupled to, the phone application platform 110. Thus FIG. 2 also includes a recognition server 210, an audio server 213, a text to speech server 214, an audio repository 212, the shared database 112, a database 226, the Internet 106, a database 228 and a web site 230. The call manager 200 within the phone application platform 110 is coupled to the execution engine 202. The execution engine 202 is coupled to the recognition server 210, the audio server 213, data connectivity engine 220, the evaluation engine 222 and the streaming engine 224. The data connectivity engine 220 is coupled in communication with the shared database 112, the database 226 and the Internet 106. The Internet 106 is coupled in communication with database 228 and the web site 230. The audio server 213 is coupled to the text to speech server 214 and the audio repository 212.

The following describes each of the elements of FIG. 2 in greater detail. In some embodiments of the invention, the phone application platform 110 is implemented using one or more computers. The computers may be server computers such as UNIX workstations, personal computers and/or some other type of computers. Each of the components of the phone application platform 110 may be implemented on a single computer, multiple computers and/or in a distributed fashion. Thus, each of the components of the phone application platform 110 is a functional unit that may be divided over multiple computers and/or multiple processors. The phone application platform 110 represents an example of a telephone interface subsystem. Different components may be included in a telephone interface subsystem. For example, a telephone interface subsystem may include one or more of the following components: the call manager 200, the execution engine, the data connectivity 220, the evaluation engine 222, the streaming subsystem 224, the audio repository 212, the audio server 213, the text to speech 214 and/or the recognition engine 210.

The call manager 200 is responsible for scheduling call and process flow among the various components of the phone application platform 110. The call manager 200 sequences access to the execution engine 202. Similarly, the execution engine 202 handles access to the recognition server 210, the audio server 213, the data connectivity engine 220, the evaluation engine 222 and the streaming engine 224.

The recognition server 210 supports voice, or speech, recognition. The recognition server 210 may use Nuance 6(™) recognition software from Nuance Communications, Menlo Park, Calif., and/or some other speech recognition product. The execution engine 202 provides necessary grammars to the recognition server 210 to assist in the recognition process. The results from the recognition server 210 can then be used by the execution engine 202 to further direct the call session. Additionally, the recognition server 110 may support voice login using products such as Nuance Verifier(™) and/or other voice login and verification products. Additionally, not shown in the figure, the recognition server 210 may use HTTP, or other suitable protocols, to retrieve grammars identified using a uniform resource indicator (URI) from servers. These requests can access servers across the Internet 106, e.g. a grammar stored on the web site 230.

The audio server 213 provides audio playback capabilities and uses a text to speech server 214 and an audio repository 212 to obtain some of the sounds presented in the system. According to one implementation, the <AUDIO> VoiceXML tag is supported in such a fashion that if the requested SRC file cannot be obtained, the text to speech server 214 is requested to generate speech for the tag contents. For example, "<AUDIO SRC="number98.wav">98</AUDIO>" would result in the audio server 213 first attempting to retrieve the source file "number98.wav" from the audio repository 212, or other specified server using HTTP, or other suitable protocols. If the file is unavailable, cannot be retrieved, or cannot be retrieved in a timely enough fashion, the text to speech server 214 is automatically called to generate the speech synthesized version of the number "98".

Additionally, the audio server 213 can adjust the timing, balance, and eliminate audio artifacts (e.g., "clean") in the sounds being played back so as to provide an aurally smooth and pleasing sound to the user. Further, when appropriate, the execution engine 202 may batch a group of <AUDIO> and <PAUSE> commands together and to pass them to the audio server 213. This allows for the most natural playback of sounds from a timing standpoint. The basic grouping criteria is that there be no intervening commands unrelated to audio playback.

Additionally, the audio server can support retrieval of non-static materials, e.g. streaming audio, audio data feeds, and/or other types of audio data. Embodiments of the invention may include appropriate software for accessing common streaming protocols and their data streams, e.g. RealAudio(™), RealVideo(™), QuickTime(™), etc., using the audio server 213.

The text to speech server 214 supports the conversion of text to synthesized speech for transmission over the telephone gateway 107. For example, a request that the phrase, "The temperature in Palo Alto, Calif., is currently 58 degrees and rising" be spoken to a caller could be made. That phrase would be translated to speech by the text to speech server 214 for playback over the telephone network on the telephone (e.g. the telephone 100). Additionally the text to speech server 214 may respond using a selected dialect and/or other voice character settings appropriate for the caller.

The audio repository 212 may include recorded sounds and/or voices. In some embodiments the audio repository 212 is coupled to one of the databases (e.g. the database 226, the database 228 and/or the shared database 112) for storage of audio files. The audio repository server 212 responds to requests to play a specific sound or recording. According to some embodiments of the invention, the audio repository 212 is accessed according to the hypertext transfer protocol (HTTP).

For example, the audio repository 212 may contain a standard voice greeting for callers to the phone application platform 110, in which case the execution engine 202 could request play-back of that particular sound file. The selected sound file would then be delivered by the audio repository 212 through the call manager 200 and across the telephone gateway 107 to the caller on the telephone, e.g. the telephone 100. Additionally, the telephone gateway 107 may include digital signal processors (DSPs) that support the generation of sounds and/or audio mixing.

The execution engine 202 supports the execution of multiple threads with each thread operating one or more applications for a particular call to the phone application platform 110. Thus, for example, if the user has called in to the phone application platform 110, a thread may be started to provide her/him a voice interface to the system and for accessing other options.

In some embodiments of the invention an extensible markup language (XML)-style language is used to program applications. Each application is then written in the XML-style language and executed in a thread on the execution engine 202. In some embodiments, an XML-style language such as VoiceXML from the VoiceXML Forum, see <http://www.voicexml.org/>, is extended for use by the execution engine 202 in the phone application platform 110.

Additionally, the execution engine 202 may access the data connectivity engine 220 for access to databases and web sites (e.g. the shared database 112, the web site 230), the evaluation engine 222 for computing tasks and the streaming engine 224 for presentation of streaming media and audio. The streaming engine 224 may allow users of the phone application platform 110 to access streaming audio content, or the audio portion of streaming video content, over the telephone interface. For example, a streaming media broadcast from ZDNet(™) could be accessed by the streaming engine 224 for playback through the voice portal.

The data connectivity engine 220 supports access to a variety of databases including databases accessed across the Internet 106, e.g. the database 228, and also access to web sites over the Internet such as the web site 230. In some embodiments the data connectivity engine can access standard query language (SQL) databases, open database connectivity databases (ODBC), and/or other types of databases. The shared database 112 is represented separately from the other databases in FIG. 2; however, the shared database 112 may in fact be part of one of the other databases, e.g. the database 226. Thus, the shared database 112 is distinguished from other databases accessed by the phone application platform 110 in that it contains user profile information.

A summary of the phone application platform features provided according to some embodiments of the invention follows. Then, the processes and features of the remotely hosted development environment are presented in greater detail.

2. Phone Application Platform Features

According to some embodiments of the invention, the phone application platform supports a Voice Extensible Markup Language (VoiceXML) standard such as the VoiceXML specification 1.0, 7 Mar. 2000, with extensions and some implementation specific limitations.

For example, according to some embodiments, a VoiceXML specification is extended so that the phone application platform 110 can recognize a <DEBUG> command. In some embodiments of the invention, the container contents between <DEBUG> and </DEBUG> are automatically included in the debugging information provided to developers performing remotely hosted development. Similarly, Javascript(™) methods are provided for outputting debugging information according to some embodiments of the invention where Javascript(™) is supported within phone applications.

The specific platform features are not highly relevant except as they relate to the general problem of phone application development. That is because if Company X and Company Y have different platform features, then a developer who was using traditional phone application development techniques might need different specialized hardware and software to develop for each platform. In contrast according to embodiments of the present invention, the developer would not need to maintain any specialized hardware and/or software for developing for the phone application platform 110.

For the remainder of this discussion, an XML based phone application programming language is considered. The processes and features of the remotely hosted development environment will now be presented.

D. Remotely Hosted Development Environment

FIGS. 3–6 are screen shots of web pages presented by the remotely hosted phone application development environment to developers. FIG. 7 is a process flow chart for developing an application using the remotely host phone application development environment. The process of FIG. 7 will be described with reference to FIGS. 3–6. The process of FIG. 7 and the corresponding screen shots could be implemented using the software and hardware architecture described in conjunction with FIGS. 1 and 2.

The process starts at step 700, where a developer registers and/or logs in to the development environment, e.g. by identifying herself/himself to a web-based application on the development platform web server 108. The policy decisions surrounding who can register can be set by the operator of the remotely hosted phone application development environment. Similarly, the operator can determine other policy decisions such as whether there is a charge for using the development environment and the nature and format of that charge. Other policy decisions include whether the developer has to pay for the calls to the test her/his phone application, e.g. use of 800-number versus regular toll call.

Next, at step 702, the developer is given access to the development environment. An initial web page of the development environment according to one embodiment of the invention is shown as FIG. 3. An identifier 300 is assigned to each developer to identify that developer, e.g. a five-digit number. In this example, the identifier 300 has been masked out in FIG. 3, for the remainder of this discussion the identifier 12345 will be used. Also, a call in number 302 is provided, again the last portion of the call in number is masked out.

Different developers may be given different call-in numbers on a per session basis, on a permanent basis, or based on their affiliation with the operator of the remotely hosted phone application platform. For example, preferred developers might be provided an 800-number call-in number while other developers were provided a non-free phone number. Similarly, if the phone application platform 110 is implemented in a distributed fashion across multiple call-in numbers, the call-in number may be dynamically returned.

The ability of phone calls to occur asynchronously relative to the development process is shown in FIG. 7 by the block 760. According to some embodiments of the invention, the applications being developed can be accessed by multiple users simultaneously at the call in number 302. In some embodiments, a different call in number is provided to developers for access to their application when not logged in to the system, e.g. if giving a demonstration, etc.

Similarly, block 750 shows the asynchronous process whereby a developer makes edits to the application file, or files. For example, a developer can modify the application file, e.g. the application file 114, using a text editor, e.g. NOTEPAD.EXE under Windows(™) operating system ("OS"), vi or emacs under a UNIX(™) OS variant, BBEdit (™) editor on a Macintosh(™) platform, and or some other type of text editor. Similarly, the developer can place audio files, e.g. in WAV format, on the web server 101, and/or other materials appropriate to her/his phone application. For example, in some instances a phone application may call a Common Gateway Interface (CGI) program on the web server 101 to retrieve/return a result. The developer can asynchronously edit any CGI programs as well. Also, the program file itself may be dynamically generated by another program, e.g. a CGI program.

As a note, many personal computers come with built in web server capabilities, e.g. Macintosh(™) computers include the Apple(™) Personal Web Sharing software for sharing the contents of a folder, similar software is available and/or included with most other computers, e.g. Windows (™) computers, Linux(™) computers, etc. Accordingly, the developer may not even need to upload her/his files to the web server 101. Instead, in such configurations, she/he just stores them in a suitable location on her/his computer 102, which is acting as the web server 101.

Returning to the process flow of FIG. 7, two primary modalities are provided for application development according to some embodiments of the invention: reference, or URI, based development and direct in browser, or scratch-pad, based development. These are represented in FIG. 7 by steps 704 and 706 respectively.

1. Reference/URI Based Development

Figure 3:
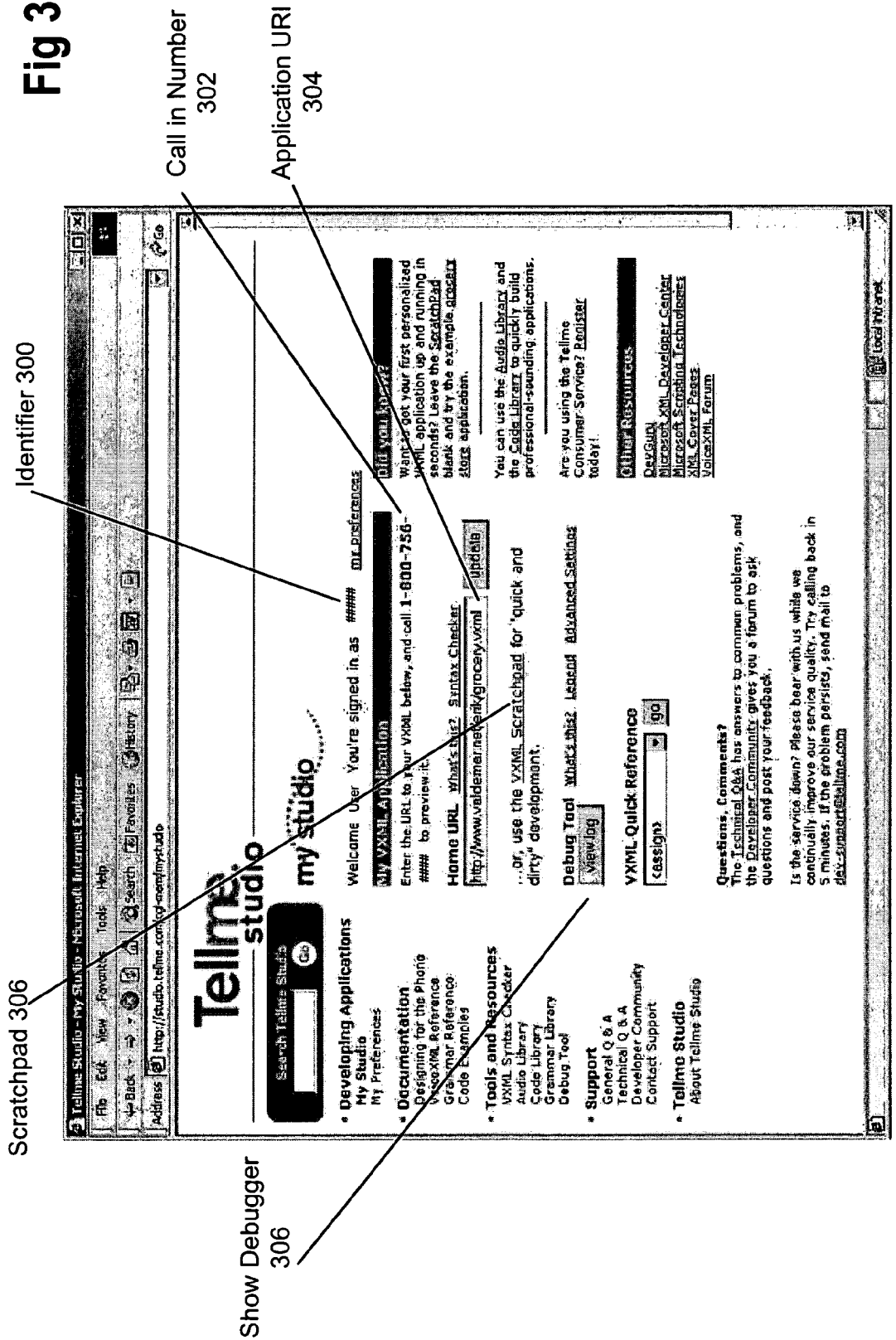

FIG. 3 shows an example of the URI type development of step 704. An application URI field 304 is provided in the web based development environment to identify the URIs of one or more applications. In the example of FIG. 3, only a single URI is permitted at a given time. In this instance the application file 114 is identified by the URI <http://www.valdemar.net/erik/grocery.vxml>. The URI serves as a reference, or pointer, to the actual application code for the phone application platform 110. According to some embodiments of the invention, a developer makes her/his application available for testing at the call in number 302 by submitting the URI to the development platform web server 108, e.g. by clicking an HTML form submit button. Upon submission, the development platform web server 108 sends appropriate messages and/or updates suitable shared data, e.g. in the shared database 112, to notify the phone application platform 110 to make the referenced phone application available.

Some embodiments of the invention may allow the developer to store multiple URIs. In those configurations, depending on the choices made by the operator of the remotely hosted phone application development platform, may either have to chose a single "active" application for the call in number or may automatically be prompted when calling the call in number to select from the available applications. Note, however, that according to some embodiments of the invention, a given phone application can invoke another phone application. In such embodiments, a developer can always develop a "menu" application and register that as the URI where the menu application provides prompting at the call in number 302 to select among the developers applications. Of course, it is possible for the developer herself/ himself to launch other phone applications using appropriate commands, e.g. <GOTO> and <GOSUB>.

2. In Browser/Scratchpad Based Development

Figure 4:
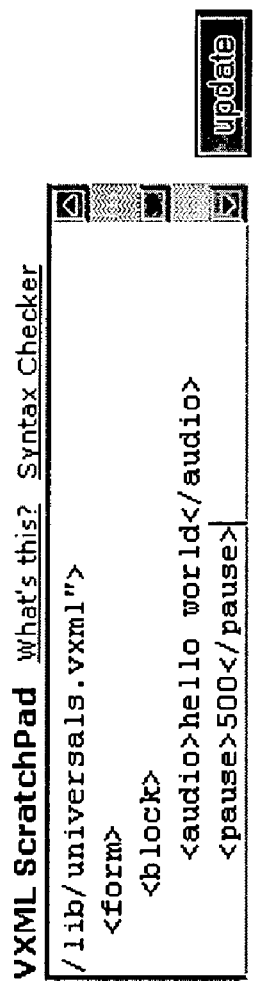

In a similar vein, at step 706, the developer can perform in browser, or scratchpad, based development. FIG. 3 shows the scratchpad 306 in its collapsed state. FIG. 4 shows that after following the scratchpad link, a text entry field appears for development. In some embodiments, the scratchpad is an HTML form element. According to other embodiments, it is a Java(™), Javascript(™), or other browser based scripting language, based program that supports text editing with the file data stored on a remote host, e.g. the development platform web server 108, or other suitable remote host. Text can be input directly in the scratchpad area or alternatively, text can be entered into the scratchpad using the cut-and-paste facilities of the developer's local computer environment.

According to the embodiment shown in FIGS. 3 and 4, the scratchpad and URI based development options are mutually exclusive. Thus, in this embodiment, the developer either works from the scratchpad or she/he works on a text file hosted on a web server, e.g. the application file 114, and specifies the URI. According to one embodiment of the invention, selecting between these modes simply selects whether the scratchpad application or the URI application is "live" on the phone application platform 110. This allows the developer to test short code segments using the scratchpad, incorporate them into her/his application file, and then switch back to URI based development mode and find the URI unchanged. Similarly, on switching back to the scratchpad, the scratchpad contents may be preserved.

3. Syntax Checking

Another useful part of application development is syntax checking. Because VoiceXML is an interpreted language there is no compilation process such as with C for detecting invalid structures.

At step 708, the developer can request that her/his application be syntax checked. Importantly, this syntax checker may actually perform multiple tasks beyond verifying the well-formedness of the VoiceXML code. In some embodiments, the syntax checker verifies the application file against the document type definition (DTD) specified in the application file. In some embodiments, an outline style parsed view of the application is presented responsive to the syntax checking. This view is visible in standard web browsers, e.g. Internet Explorer(™), and allows the developer to review any syntax errors as well as view her/his application as a hierarchical outline of containers.

Other features that can be included in the syntax checking include grammar verification, e.g. test compile any developer provided grammar, with feedback provided to the developer. Similarly, to the extent possible, inline scripts within the phone application, e.g. in a language such as Javascript(™), can be syntax checked.

4. Debugging or Call Flow

The colloquial term "debugging" is sometimes used to refer to the call flow output. The call flow output provides important benefits for phone application development because it allows a developer to understand how her/his application is behaving. This can be enhanced by providing call flow information concurrently with phone calls to the phone application platform 110.

By concurrent it is meant that the information about the execution of the phone application is available on the phone application platform to a developer as a telephone call takes place. Thus, as a phone application transitions from a first state to a second state, that information is available to the developer while she/he is on the phone using the application. Similarly, the results of speech recognition can be shown, thus the developer can distinguish between a speech recognition error and a program logic error easily. In some embodiments the concurrency is in near real time with the call flow, or debugging, output being provided over an HTTP connection to the developer's computer, e.g. the computer 102, with only a minimal amount of delay, e.g. frequently less than a second, network conditions permitting.

The call flow information tracks a flow of execution for a phone call. Thus, even as file boundaries in the phone application are hit, the call flow information can continue to track the progress of the application. This is useful because it may be desirable to split an application into multiple files for code factoring, code sharing, and/or other purposes.

Similarly, for any given phone call, the amount of call flow information shown to the developer may be controlled by setting options at step 710. In the example of FIG. 6, a series of check boxes, reference numeral 602, are used to select which classes of debugging information are output. Some embodiments of the invention define six classes of debugging information:

Errors: Errors represent compile-time and run-time errors in preparing the application for execution or executing the application. In some instances these errors could have been detected according to the syntax checking of step 708. In some embodiments of the invention, this type of error cannot be disabled in the call flow log.

General Flow Trace: This allows the developer to follow the phone application state transitions as VoiceXML containers are entered and/or exited.

Event Trace: This allows the developer to follow the phone application events. In particular, VoiceXML uses events and event handlers to implement certain functions. This debugging class allows developers to see which events are being "thrown" and where and how they are being "caught", if at all.

Field Fill Trace: This allows developers to track the results of fields being filled. In particular, VoiceXML uses a form-field metaphor together with filling to receive information from users. This debugging class allows the developer to see which fields are being filled and with what contents.

Variables Trace: This allows developers to track the setting and reading of variables. This is useful for monitoring internal application state. For applications of suitable complexity this is extremely important for being able to review the program logic and function.

Custom Trace: Although not shown in the embodiment of FIG. 6, some embodiments output developer defined custom messages. In some embodiments, suitable extensions to VoiceXML are provided to support debugging, e.g. <DEBUG>output string</DEBUG> along with suitable Javascript(™) functions, where appropriate, e.g. vxmllog( ).

The specific classes of call flow information made available to developers are selectable by the operator of the remotely hosted phone application development environment. They can be customized to the needs of phone application developers as well as the specific language and/or platform features and extensions.

Another feature of the development environment is that some embodiments can support multiple calls to a single application simultaneously. For that reason a call selector 600 is provided in some embodiments to control which telephone call the debugging output is shown for. To support this feature, some embodiments notify a caller when they dial the call in number 302 of their "call number", e.g. "123". The developer can use that information at step 710 to select only that call.

At step 712, the debugging information is displayed. This state can be reached directly from step 702, as well as step 710, according to some embodiments of the invention. The basic debugging format is for an HTTP capable server, e.g. the development platform web server 108, the phone application platform 110, or other server, to provide the call flow information over an HTTP connection to a browser window opened by (or for) the developer, e.g. on her/his computer 102. The debugging information can be delivered in a XML format, e.g. HTML or a specific debugging XML format.

The call flow output for the sample application at the URI indicated in FIG. 3 is shown in FIG. 5 for the first portion of the telephone call. The top portion of the call flow window provides general information, e.g. call in number 302, an indicator 500 of which call the information shown applies to, etc. When in "all calls" mode, the call flow information from multiple calls can be displayed interspersed with one another. Suitable call number identifiers can be prefixed in front of the output to indicate the corresponding call to which the output applies.

The call flow information follows in a color-coded format, reference numeral 502. Color-coding is used in some embodiments of the invention to differentiate between the different classes of call flow information, with one color for each class. This makes it easier to review a log and monitor it since the different classes of information are colored differently. New information can be added at the bottom, or at the top in some embodiments, and where appropriate the browser sc roll position can be automatically adjusted to keep the most current debugging information in the viewed portion of the window. Still other embodiments do not automatically scroll the window to allow the developer to review the log without it "moving" away from what she/he is looking at. Still other formats are possible, for example, like the syntax checking feature, an outline style view could be used that allows the log to be collapsed in logical groups.

For example, some embodiments support real-time call flow visualization. This takes information from the phone application platform and presents both the call flow information visually as the developer is interacting with the application on the phone. This visualization can both highlight regions in the code that are being interpreted, present a higher-level visualization of the application as a visual call flow, and/or provide other visualization information that helps a developer understand her/his program.

5. Developer Tools Needed and Useful Features

A developer does not need any specialized software or hardware to develop phone applications using the remotely hosted phone application development environment. She/he needs only a computer, e.g. the computer 102, a web browser (for scratchpad only development), access over a network, e.g. the Internet, to the development platform web server 108, and a telephone to test her/his applications. If more serious applications are being developed, the developer may want a text editor and will also need access to a web server of her/his own to store the applications and any associated sound files. Both setups provide zero-footprint development.

In order to further assist developers, the operator of the remotely hosted development environment may make a number of modules, or other reusable code segments, available to developers. Some embodiments of the invention provide the following types of resources to developers: an audio library, a grammar library, and an application library.

The audio library may include shared audio files that can be referenced by applications. These might include useful sounds like times, e.g. "10:10" pronounced by an announcer as opposed to a speech synthesizer, earcons—auditory icons—that are used to provide cues to the end user, and/or other audio files.

The grammar library includes opaque grammars for developer access. The term opaque indicates that the developer is not necessarily provided source level access to the grammar. Rather, the developer accesses the grammar by referencing its name, as such:

<grammar>
<![CDATA[
GrammarName
]]<
</grammar>

Using this approach, a company can safely provide complex grammars to developers without revealing the implementation. Some embodiments include grammars for: commands (yes/no with variations), credit card related grammars (card number and expiration date grammars), date and time grammars (time and date input as well as duration input), financial grammars (currency inputs), location grammars (city/state input), number grammars (entry of natural numbers, percents, social security numbers), and phone grammars (telephone number input).

This approach is more flexible than simply providing a URI in the "src" element of the <GRAMMAR> tag as it allows combinations of grammars to be selected by the developer, e.g. SEVEN_DIGIT_PHONE_NUMBER or TEN_DIGIT_PHONE_NUMBER, by simply listing both grammar names.

These grammars are typically heavily developed to recognize many variations and alternate forms. For example, the credit card number grammar provided supports 15 and 16 digit credit card numbers and supports natural clusters with each four-digit group as well as DTMF, or touch-tone, input. Thus, for example for the fragment of a credit card number "1800 1234" the end user could say "eighteen hundred" and then say "one two three four", etc. Further, the use of a common grammar allows the developer to focus her/his development efforts on the application specific logic and allows the developer to leverage refinements in the underlying grammars, e.g. upgrades to the credit card grammar to recognize more variations.

Similarly, a module format has been developed that allows developers to access opaque phone application code. A namespace of variable names is selected for module inputs, e.g. session.toolbox.*. Variables within that space are specific to the provided modules.

A developer can then use modules by assigning values to the appropriate module inputs, e.g. <assign name= "session.toolbox.daydate.date" expr="'4/9/00'"/>, and then calling the module code, e.g. <gosub next= "http://resources.tellme.com/toolbox/daydate/date_module.vxml">. The module will throw predefined events to report any successes/failures as well as set any appropriate variables with output information.

To preserve module opacity, the server hosting the module can be programmed to only allow HTTP requests for the module from specified servers, e.g. the phone application platform 110. Thus, the developer could not use the computer 102 to retrieve the designated module file. Like the grammar library, this allows the developer to leverage well-developed tools for certain tasks and focus her/his development efforts on their application's logic.

Some modules provided by embodiments of the invention include: a date module for pronouncing dates using recorded speech in a variety of formats (e.g. with/without day of week), a time module for pronouncing times using recorded speech in a variety of formats (e.g. account for timezone, convert 24/12 hour time, etc.); a time duration module for pronouncing periods of time using recorded speech in a variety of formats (e.g., hours, minutes, seconds, days, etc.); a phone number module for playing back a phone number using recorded audio; a prices module for playing back a price using recorded audio; and a city-state module for pronouncing city and state names using recorded audio.

When Javascript(™) is used in conjunction with VXML, some opaque methods and properties may be available from within Javascript(™) such as: a caller-geography object (provides opaque access to telephone identifying information and related information, e.g. city name, state, timezone, etc.); a city-state/zip code translator (translates from zip codes to a city/state and vice-versa), a multi-value grammar parser (useful if a grammar returns an aggregate value in a single variable, this will parse the return value into multiple session variables), a session variable copier with list support (copies one session variable to another while copying the whole list).

The specific modules and capabilities provided reduce development costs and time. In internal testing, it has been found that non-programmers can prototype complicated electronic commerce-oriented applications quickly. That is because normally hard-to-program features have been modularized, e.g., locations, credit card numbers, etc. As the libraries are expanded this rapid application development capability will only increase.

6. Converting Web Based Applications

Embodiments of the invention allow the developed phone application to interact, e.g. using CGI, HTTP requests, and/or other mechanisms, with other web-based systems. Accordingly, if a company has web-based applications, they can typically be interfaced with a phone application through porting of the front end, e.g. the HTML content to VoiceXML. Doing this well can be a large task and the ability to share the common backend systems used for the web based applications reduces the cost of conversion and ongoing maintenance. Some embodiments of the invention support a Phone Application State Management Mechanism that allows a developer to get and store state within their phone application. In some instances, this mechanism may provide compatibility with existing web-based standards for state management to further reduce porting costs.

Similarly, the phone application platform 110 can support the execution of dynamically generated applications, e.g. where a CGI, or other program, on a web server is dynamically provides the content of the executed application.

E. CONCLUSION

A zero-footprint remotely hosted phone application development environment is described. The environment allows a developer to use a standard computer without any specialized software (in some embodiments all that is necessary is a web browser and network access) together with a telephone to develop sophisticated phone applications that use speech recognition and/or touch tone inputs to perform tasks, access web-based information, and/or perform commercial transactions.

Once the source code of phone application is identified to the development environment, the developer can use a telephone to immediately call the application on the hosted development environment. Some embodiments support concurrent call flow tracking that allows a developer to observe, using a web browser, the execution of her/his application.

A variety of reusable libraries are provided to enable the developer to leverage well-developed libraries for common playback, input, and computational tasks. This focuses the development on application specific logic. Embodiments of the invention simplify the process of defining speech recognition grammars within their applications. Embodiments of the invention support rapid application deployment from the development environment to hosted application deployment to the intended audience. Further, because the development environment can be configured to behave identically (language extensions, features, etc.) to the hosting environment, there are no surprises due to incompatibilities.

In some embodiments, phone application platform 110 and the development platform web server 108 can be hardware based, software based, or a combination of the two. In some embodiments, phone application platform 110 and/or the development platform web server 108 are comprised of one or more computer programs that are included in one or more computer usable media such as CD-ROMs, floppy disks, or other media. In some embodiments, call manager programs, execution engine programs, data connectivity engine programs, evaluation engine programs, streaming subsystem programs, recognition server programs, text to speech programs, syntax checking programs, call flow monitoring programs, and/or scratchpad programs, are included in one or more computer usable media.

Some embodiments of the invention are included in an electromagnetic wave form. The electromagnetic waveform comprises information such as call manager programs, execution engine programs, data connectivity engine programs, evaluation engine programs, streaming subsystem programs, recognition server programs, text to speech programs, syntax checking programs, call flow monitoring programs, and/or scratchpad programs The electromagnetic waveform may include the programs accessed over a network.

The foregoing description of various embodiments of the invention has been presented for purposes of illustration and description. It is not intended to limit the invention to the precise forms disclosed. Many modifications and equivalent arrangements will be apparent.

What is claimed is:

1. A method of supporting development of a phone application code for a computer based phone application platform having a network interface and a telephone interface, the method comprising:
   receiving the phone application code at the computer based phone application platform over the network interface from a remote computer via a development platform web server and using a web protocol;
   associating the phone application code with a telephone number for communicating with the telephone interface; and at the computer based phone application platform, responsive to receiving a telephone call via the telephone number, executing the phone application code;

presenting an audio output over the telephone interface; and presenting a call flow to the remote computer over the network interface via the development platform web server and using the web protocol, the call flow tracking a flow of execution for a phone call.

2. The method of claim 1, wherein the call flow shows a flow of program control in the phone application code during the telephone call.

3. The method of claim 1, further including receiving a plurality of selectable types of debugging events usable in the call flow, wherein types of debugging events include errors, a general flow trace, an event trace, a field fill trace, and a variables trace.

4. The method of claim 1, wherein the call flow is concurrent with execution of phone application code on the computer based phone application platform.

5. The method of claim 1, wherein the receiving comprises receiving an HTTP request including form data, the form data comprising the phone application code.

6. The method of claim 1, wherein the computer based phone application platform operated by a first legal entity and wherein the remote computer operated by a second legal entity different from the first legal entity.

7. The method of claim 1, wherein associating the phone application code with the telephone number comprises associating a uniform resource identifier (URI) with the telephone number, the URI serving as a pointer to the phone application code.

8. The method of claim 7, wherein receiving the phone application code at the computer based phone application platform comprises:

at the computer based phone application platform, responsive to receiving the telephone call via the telephone number, accessing the phone application code via the URI.

9. A method of supporting development of a phone application code for a computer based phone application platform having a network interface and a telephone interface, the method comprising:

receiving the phone application code at the computer based phone application platform over the network interface from a remote computer via a development platform web server and using HTTP;

associating the phone application code with a telephone number for communicating with the telephone interface; and at the computer based phone application platform, responsive to receiving a telephone call via the telephone number, executing the phone application code;

presenting an audio output over the telephone interface; and presenting a call flow to the remote computer over the network interface, the call flow tracking a flow of execution for a phone call.

10. The method of claim 9, further including receiving a plurality of selectable types of debugging events usable in the call flow, wherein selected types of debugging events can include a general flow trace, an event trace, a field fill trace, a variables trace, and, optionally, a custom trace.

11. The method of claim 9, wherein the remote computer does not include specialized phone application development software.

12. The method of claim 9, wherein associating the phone application code with the telephone number comprises associating a uniform resource identifier (URI) with the telephone number, the URI serving as a pointer to the phone application code.

13. The method of claim 12, wherein receiving the phone application code at the computer based phone application platform comprises:

at the computer based phone application platform, responsive to receiving the telephone call via the telephone number, accessing the phone application code via the URI.

14. A method of supporting development of a phone application code for a computer based phone application platform having a network interface and a telephone interface, the method comprising:

receiving at the computer based phone application platform a reference to the phone application code over the network interface from a remote computer via a development platform web server and using a web protocol;

associating the phone application code with a telephone number for communicating with the telephone interface using the reference; and at the computer based phone application platform, responsive to receiving a telephone call via the telephone number, executing the phone application code;

presenting an audio output over the telephone interface; and presenting a call flow to the remote computer over the network interface via the development platform web server and using the web protocol, the call flow tracking a flow of execution for a phone call.

15. The method of claim 14, wherein the reference comprises a uniform resource locator (URI).

16. The method of claim 14, wherein the executing further comprises retrieving the phone application code from the reference over the network interface.

17. The method of claim 14, wherein the call flow is concurrent with execution of phone application code on the computer based phone application platform.

18. The method of claim 14, wherein the computer based phone application platform operated by a first legal entity and wherein the remote computer operated by a second legal entity different from the first legal entity.

19. The method of claim 14, wherein associating the phone application code with the telephone number comprises associating a uniform resource identifier (URI) with the telephone number, the URI serving as a pointer to the phone application code.

20. The method of claim 19, wherein executing the phone application code comprises:

at the computer based phone application platform, responsive to receiving the telephone call via the telephone number, accessing the phone application code via the URI.

21. A method of supporting remotely hosted phone application development for a phone application platform using a first computer system, the first computer system supporting a web interface, the method comprising:

receiving at the first computer system over the web interface a uniform resource identifier (URI) from a second computer system, the URI corresponding to a location of a phone application;

at the first computer system, responsive to the receiving the URI, sending a first message to the phone application platform using the first computer system, the first message corresponding to a request to make the phone application located at the URI available on the phone application platform at a telephone number; and upon receiving a request from the second computer system on the first computer system, presenting to the second computer debugging information generated by calls to the telephone number for the phone application on the phone application platform, wherein the debugging information includes a flow of execution for the calls.

22. The method of claim 21, further comprising sending a second message to the second computer system, the second message indicating the telephone number for accessing the phone application on the phone application platform.

23. The method of claim 21, wherein the presenting occurs concurrently with execution of the phone application on the phone application platform.

24. The method of claim 21, wherein the presenting provides the debugging information in an extensible markup language (XML).

25. The method of claim 24, wherein the debugging information in the XML comprises a hypertext markup language with color coded messages, and wherein different colors are used for different types of debugging events.

26. The method of claim 21, wherein the presenting is capable of selecting the debugging information for a particular ongoing execution of the phone application on the phone application platform.

27. The method of claim 21, wherein the presenting is capable of selecting the debugging information for all ongoing executions of the phone application on the phone application platform.

28. The method of claim 21, further comprising a web interface for selecting the types of debugging events.

29. The method of claim 28, wherein the types of debugging events can comprise debugging output from phone application states, phone application events, phone application field fills, phone application variables, and custom debugging messages.

30. The method of claim 21, wherein responsive to the sending the first message, the phone application platform configured to retrieve and execute the phone application at the URI responsive to a call to the telephone number.

31. The method of claim 30, wherein the phone application platform is configured to execute the phone application responsive to receipt of an identifier at start of a call to the telephone number.

32. The method of claim 30, wherein the phone application is provided by a developer having a corresponding identifier, and wherein the phone application platform is configured to execute the phone application responsive to receipt of the identifier at start of a call to the telephone number.

33. The method of claim 21, wherein the phone application comprises an application written in an XML-based voice application language.

34. An apparatus for developing a phone application code, the apparatus comprising:

a network interface for receiving a reference to the phone application code, the network interface using a web protocol;

a telephone interface to send and receive audio signals to and from a telephone; and a control subsystem to control the network interface and the telephone interface, the control subsystem including at least one program for receiving a reference to the phone application code over the network interface from a remote computer using the web protocol;

associating the phone application code with a telephone number for communicating with the telephone interface using the reference, and responsive to receiving a telephone call via the telephone number, executing the phone application code, presenting an audio output over the telephone interface, and presenting a call flow to the remote computer over the network interface, the call flow tracking a flow of execution for the telephone call.

35. An apparatus for remotely hosted phone application development using a first computer system, the apparatus comprising:

means for receiving at the first computer system over a web interface a uniform resource identifier (URI) from a second computer system, the URI corresponding to the location of a phone application;

means for sending a first message to a phone application platform responsive to the receiving the URI, using the first computer system, the first message corresponding to a request to make the phone application located at the URI available on the phone application platform at a telephone number; and means for presenting to the second computer system a call flow generated by calls to the telephone number for the phone application on the phone application platform upon receiving a request from the second computer system, the call flow tracking a flow of execution for the calls.

* * * * *